W. B. GRAY.
RESILIENT WHEEL.
APPLICATION FILED JAN. 30, 1913.
1,139,673.
Patented May 18, 1915.
2 SHEETS—SHEET 1.
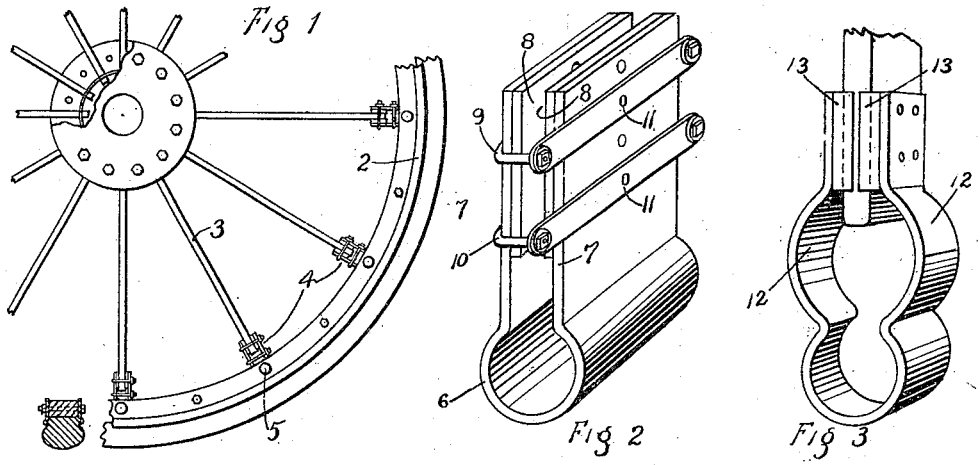
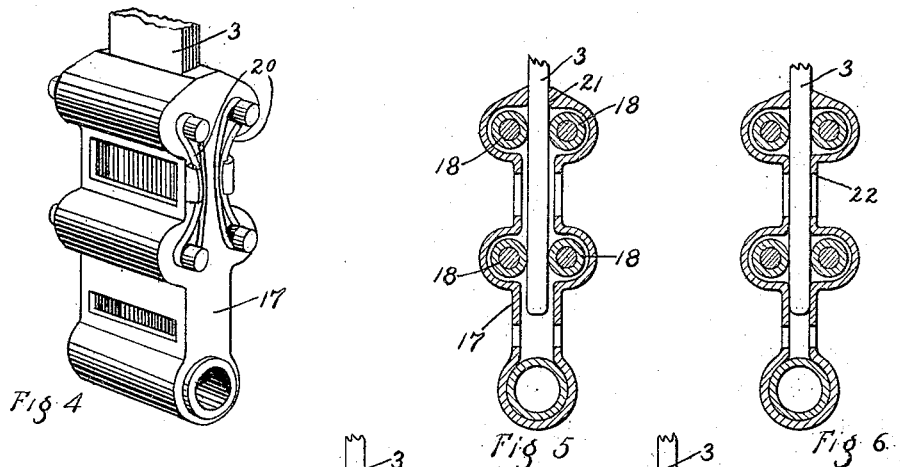
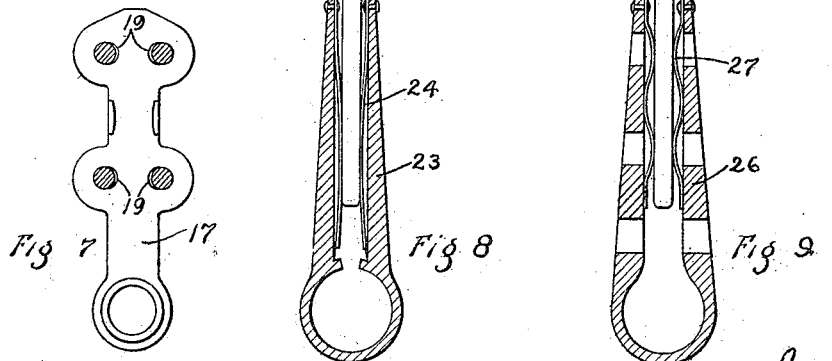

W. B. GRAY.
RESILIENT WHEEL.
APPLICATION FILED JAN. 30, 1913.
1,139,673.
Patented May 18, 1915.
2 SHEETS—SHEET 2.
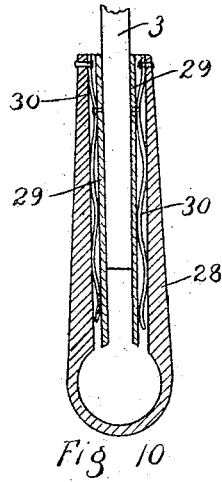
Fig. 10
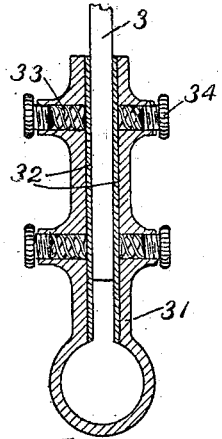
Fig. 11
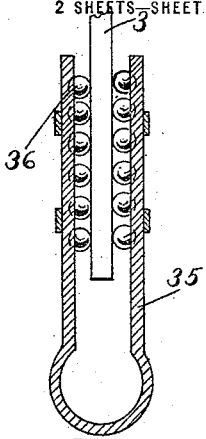
Fig. 12
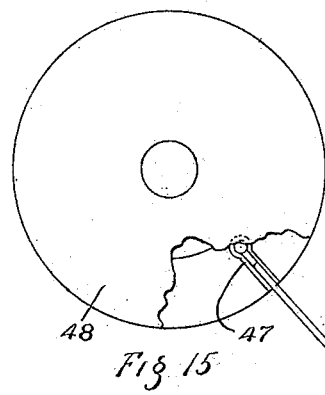
Fig. 15
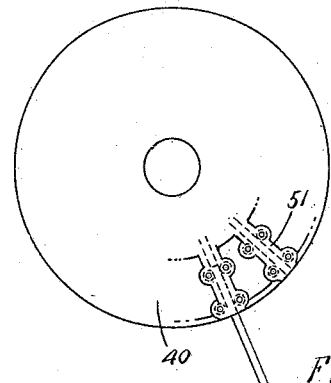
Fig. 16
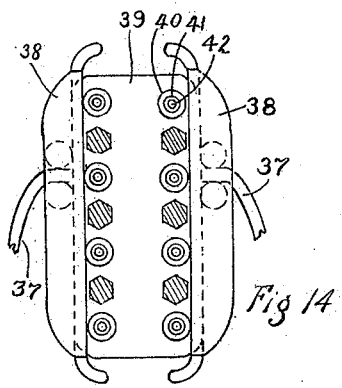
Fig. 14
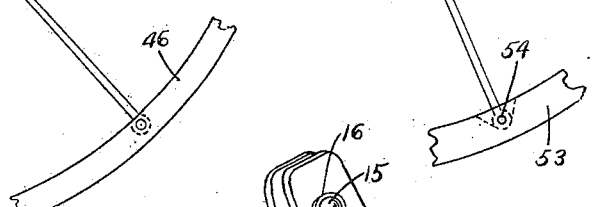
Fig. 13a   Fig. 13
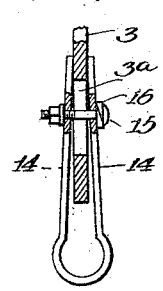
Witnesses
E. B. Brunt
Ruth E. Zetterwall
Inventor
W. B. Gray
By Chamberlin & Brandenreich
attys.

UNITED STATES PATENT OFFICE.

WILLIAM B. GRAY, OF CHICAGO, ILLINOIS.

RESILIENT WHEEL.

1,139,673.  Specification of Letters Patent.  Patented May 18, 1915.

Application filed January 30, 1913. Serial No. 745,099.

*To all whom it may concern:*

Be it known that I, WILLIAM B. GRAY, a citizen of the United States, residing at Chicago, county of Cook, State of Illinois, have invented a certain new and useful Improvement in Resilient Wheels, and declare the following to be a full, clear, and exact description of the same, such as will enable others skilled in the art to which it pertains to make and use the same, reference being had to the accompanying drawings, which form a part of this specification.

Many attempts have been made to produce resilient wheels by connecting the hubs with the rims through spring spokes or other resilient devices. It has been attempted to make spokes in part of straight flat springs so connected to the rim and hub members as to permit relative radial movement with respect to at least one of such members. Although straight flat springs are cheap and simple and can be reproduced with great uniformity so as to make them highly satisfactory elements of resilient wheels, the difficulties which have been encountered in satisfactorily connecting such springs between a hub and a rim have heretofore made the use of straight flat spring spokes commercially impracticable.

The object of my invention is to produce a simple and novel construction and arrangement of parts which shall make it practicable to produce a strong, durable and effectively cushioned wheel with spokes having the form of straight flat springs.

Two of the principal problems encountered in the construction of a satisfactory wheel having straight spring spokes are the utilization of the entire radial distance between the hub and the rim for spring purposes or, in other words, to make it possible to use a spring of maximum length; and furthermore, to provide means for preventing wear between the spokes and the parts with which they slidably engage or, if any wear occurs, for automatically taking up such wear so as to make the wheel run silently. In addition to these problems there is of course also that of cost, both initial cost and cost of making repairs and replacements.

Specifically considered, my invention may be said to have for its object to produce a novel construction and arrangement of parts which will give a maximum effective spring length to the spokes, reduce the amount of wear and automatically take up such wear as may occur, and reduce the initial cost and the cost of repairs and replacements to a minimum.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a fragment of a wheel arranged in accordance with one form of my invention; Fig. 2 is a perspective view on an enlarged scale of one of the yieldable sockets for slidably holding one end of the spokes; Fig. 3 is a perspective view of a modified form of socket, a part of a spoke being shown in place in the socket; Fig. 4 is a perspective view of a still further modification; Fig. 5 is a section taken through the socket illustrated in Fig. 4 on a plane at right angles to the axis of the wheel; Fig. 6 is a view similar to Fig. 5, showing a slight modification; Fig. 7 is a side view of the devices shown in Figs. 4 to 6, the roller axles being shown in section and the take-up springs being shown in section; Figs. 8, 9, 10, 11 and 12 are sections similar to Figs. 5 and 6, showing, however, several further modifications; Fig. 13 is a perspective view similar to Fig. 2, showing a slight modification of the device shown in Fig. 2; Fig. 13$^a$ is a side view of the socket shown in Fig. 13 and a portion of the spoke, parts being broken away in order more clearly to show the connection between the spoke and the socket. Fig. 14 is a vertical section taken through a modified form of socket having a movable cage carrying rollers for engagement with a spoke; Fig. 15 is a fragmentary view of a wheel showing the socket of Fig. 13 placed at the hub instead of at the rim; and Fig. 16 is a view similar to Fig. 15 showing a somewhat different arrangement, however, the sockets in this case also being at the hub instead of at the rim.

Referring to Fig. 1 of the drawings, 1 represents a wheel hub and 2 a wheel rim. 3 are spokes in the form of long straight flat springs rigidly connected in any suitable way to the hub and extending the entire distance from the hub to the rim. At the rim are suitable sockets, 4, preferably swiveled at their outer ends and adapted to have a sliding fit on the outer ends of the spokes. The sockets are preferably swiveled between the inner surface of the rim and the periphery of the rim so as to make the extent to which they project into the space between the hub and rim as small as possible. By this arrangement the effective spring length of the spokes is substantially equal to the radial distance between the hub and the rim and the spokes may therefore be made as strong and heavy as may be desired, without making them too stiff to produce effective cushioning.

The sockets may take various forms. Thus in Fig. 2 I have shown an arrangement in which a flat piece of sheet steel or other suitable metal is bent into the form of a U the yoke portion, 6, being made in the form of a segment of a cylinder so as to adapt it to fit nicely about a cylindrical bushing or bolt by which it may be secured to and swiveled on the rim. If desired, the arm members, 7, of the socket may have wearing plates, 8, secured on the inner sides thereof, or such wearing plates may be dispensed with. When the socket is manufactured, the arms are made to assume relative positions which either bring their outer ends in contact with each other or at least cause them to be spaced apart a distance less than the thickness of one of the spokes. Therefore when the end of a spoke is to be inserted between the arms, the arms must be forced apart so that, when the spoke is in place, it will be yieldingly clamped between the two arms.

When the wheel is running, the ends of the spokes slide within the sockets, and the sockets swing through small angles around the holding bolts or bushings. If the spokes or arms of the sockets wear slightly, the tension under which the arms are placed serves to force them toward each other so that they always maintain perfect contact with the spokes and there will be no lost motion which can result in making the wheel noisy. The spokes may be held against slipping out sidewise through the sockets, and the arms of the sockets may be prevented from being spread apart too far by means of a suitable bolt or shackle. In Fig. 2 I have shown two adjustable shackles, 9 and 10, surrounding the two arms of the sockets, the shackles being, if desired, fastened to one of the arms as indicated at 11. This arrangement not only holds the spokes against lateral displacement and prevents the arms of the socket from being spread apart too far, but it also provides means for manually adjusting the sockets to take up wear in case the spring action of the sockets should become weakened. Instead of the shackles, I may provide the arms of the socket with flanges or shoulders to engage with the side edges of the spokes. Thus in Fig. 3 I have shown the arms 12 of the spring socket provided with flanged wearing pieces or plates, 13, the flanges engaging with the side edges of the spoke and preventing lateral displacement.

In Figs. 13 and 13$^a$ the spring arms, 14, of the socket are connected together by a bolt, 15, which passes through them and is long enough to allow the desired expansion between the arms. In this arrangement there is preferably a spring washer, 16, under the head of the bolt so as always to hold the bolt tight and prevent it from rattling. Furthermore, where only the single bolt is used, the spoke must be provided with an elongated slot, 3$^a$, through which the bolt can pass, the slot permitting the relative radial movement between the spoke and the socket without interference on the part of the bolt.

Instead of making the socket itself of spring metal, it may be made in the form of a casting, 17, as shown in Figs. 4, 5 and 7. In this arrangement there are devices carried by the socket which yieldingly engage with the spoke and press against its opposite faces. In the arrangement illustrated, there are rollers, 18, arranged in pairs, two on each side of the spoke. The axles of the rollers lie in elongated openings, 19, in the sockets, so that the rollers can move from and toward each other. Suitable springs, 20, acting on the rollers, tend always to move them toward each other and thus always hold them yieldingly in contact with the spoke.

In the arrangement shown in Fig. 5 the body portion of the socket, at points within the mouth 21, are out of contact with the spoke; but, if desired, the socket may be so shaped that portions thereof between the inner set of rollers and the outer set may engage with the sides of the spoke as indicated at 22 in Fig. 6.

In Fig. 8 the socket 23 has curved leaf springs, 24, secured to the inner faces of its arms, these springs engaging with the spoke and serving to take up the wear.

The socket 26 illustrated in Fig. 9 is substantially the same as that shown in Fig. 8 and it has springs 27 corresponding to the springs 24, the springs 27 being corrugated or wave-like in construction so as to insure contact with the spokes at a plurality of points.

Fig. 10 illustrates a modification in which the socket 28 contains wearing plates, 29, pressed toward each other and against a spoke lying in the socket by means of flat springs, 30.

In Fig. 11 there is illustrated a slight modification of the arrangement shown in Fig. 10; the socket 31 having wearing plates 32 which are pressed toward each other by means of coiled springs, 33, seated in suitable recesses in the socket and, if desired, bearing at their outer ends against adjusting screws, 34, by which their tension may be adjusted.

The device illustrated in Fig. 12 is similar to that illustrated in Figs. 2 and 13, the spring socket 35 having balls 36 which afford anti-friction bearing for the end of the spoke.

In Fig. 14 I have illustrated an arrangement in which the spring arms 37 of the socket carry shoes 38 between which is loosely held a roller cage, 39. The rollers 40 have axle openings, 41, which are larger in diameter than the pins or bolts 42 which hold them in place. This permits the rollers on opposite sides of the socket to move from and toward each other. The spoke is adapted to lie between and engage with the two sets of rollers, and the shoes 38 bear against the outer sides of the rollers and yieldingly press them into engagement with the spoke.

If desired, the spokes 45 may be fastened to the rim 46 and have their inner ends extending loosely into sockets, 47, swiveled upon the hub 48 as indicated in Fig. 15.

If desired, an arrangement such as indicated in Fig. 16 may be employed; the hub 50 carrying stationary sockets, 51, into which the inner ends of the spokes 52 slidably extend, the outer ends of the spokes being hinged to the rim 53 as indicated at 54. The sockets illustrated in Figs. 15 and 16 may take any of the forms shown in the other figures, so as to permit wear to be taken up automatically and afford a maximum effective spring length for the spokes.

It will thus be seen that in all the forms of my invention illustrated, the straight spring spokes extend substantially the entire distance from the hub to the rim, so that a maximum spring length is obtained. It will furthermore be seen that an automatic take-up is provided in each form of my invention, whereby the free ends of the spokes will be yieldingly held and compensation for wear be made, thereby avoiding lost motion and the rattling which would follow from such lost motion.

While I have illustrated and described in detail only a few preferred forms of my invention, I do not desire to be limited to these exact forms; but intend to cover all forms and arrangements which come within the terms employed in the definitions of my invention constituting the appended claims. I desire to have it understood, moreover, that where I state that the spokes extend entirely across the space between the hub and the rim, I intend to include therein all arrangements in which the spokes are only enough shorter than the radial distance between the hub and the rim to prevent the ends of the spokes from striking against the rim (or the hub, when the sockets are on the hub) during the use of the wheel.

I claim:

1. A wheel comprising a hub member, a rim member, spring spokes extending radially across the space between said members, one end of each spoke being secured to one of said members and free from the other member, sockets swiveled to the latter member adjacent to and embracing the free end of each spoke, each of said sockets including parts yieldable from and toward each other and yieldingly pressed against opposed faces of the corresponding spoke.

2. A wheel comprising a hub member, a rim member, spring spokes extending radially entirely across the space between the said members, one end of each spoke being secured to one of said members and socket devices swiveled on the other of said members for receiving the other ends of said spokes, each socket device including spring pressed parts yieldable from and toward each other yieldingly engaging opposed faces of the corresponding spoke.

3. A wheel comprising a hub member, a rim member, spring spokes extending radially across the space between said members, one end of each spoke being secured to one of said members and the other end being free, a socket swiveled upon the other member at and embracing the free end of each of the spokes, the sockets being in the form of U-shaped plates of spring metal having their arms pressed against opposite sides of the spokes and means coöperating with said arms to limit their spreading movements.

4. A wheel comprising a hub member, a rim member, spring spokes extending radially across the space between said members, one end of each spoke being secured to one of said members and the other end being free, a socket swiveled upon the other member at and embracing the free end of each of the spokes, the sockets being in the form of U-shaped plates of spring metal having their arms pressed against opposite sides of the spokes and a bolt passing through the arms of each socket to limit the separation of the arms.

5. A wheel comprising a hub member, a rim member, spring spokes extending radially across the space between said members, one end of each spoke being secured to one of said members and the other end being free, a socket swiveled upon the other member at and embracing the free end of each of the spokes, the sockets being in the form of U-shaped plates of spring metal having their arms pressed against opposite sides of the spokes, a bolt passing through the arms of each socket to limit the separation of the arms, and a spring associated with each of the bolts and exerting a force tending to draw the arms of the sockets together.

In testimony whereof I sign this specification in the presence of two witnesses.

WILLIAM B. GRAY.

Witnesses:
WM. F. FREUDENREICH,
RUTH E. ZETTERVALL.